United States Patent
Reider et al.

(10) Patent No.: US 9,288,707 B2
(45) Date of Patent: Mar. 15, 2016

(54) TECHNIQUE FOR CABLE INTERFACE-BASED LOAD BALANCING BETWEEN CELLS

(75) Inventors: Norbert Reider, Tenyö (HU); László Hévizi, Piliscsaba (HU); Szilveszter Nádas, Budapest (HU); Sándor Rácz, Cegléd (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 63 days.

(21) Appl. No.: 14/366,554

(22) PCT Filed: Dec. 20, 2011

(86) PCT No.: PCT/EP2011/006445
§ 371 (c)(1),
(2), (4) Date: Sep. 22, 2014

(87) PCT Pub. No.: WO2013/091666
PCT Pub. Date: Jun. 27, 2013

(65) Prior Publication Data
US 2015/0055479 A1 Feb. 26, 2015

(51) Int. Cl.
 H04W 28/02 (2009.01)
 H04W 36/22 (2009.01)
 H04L 12/803 (2013.01)
 H04W 28/08 (2009.01)
 H04W 16/08 (2009.01)

(52) U.S. Cl.
 CPC ......... *H04W 28/0205* (2013.01); *H04L 47/125* (2013.01); *H04W 28/08* (2013.01); *H04W 36/22* (2013.01); *H04W 16/08* (2013.01)

(58) Field of Classification Search
None
See application file for complete search history.

(56) References Cited

FOREIGN PATENT DOCUMENTS

| | | |
|---|---|---|
| EP | 1643785 A1 | 4/2006 |
| WO | 0223936 A1 | 3/2002 |
| WO | 2009002241 A1 | 12/2008 |
| WO | 2009064553 A1 | 5/2009 |
| WO | 2013075748 A1 | 5/2013 |

OTHER PUBLICATIONS

Lobinger, Andreas et al., "Load Balancing in Downlink LTE Self-Optimizing Networks", 2010 IEEE 71st Vehicular Technology Conference, Taipei, Taiwan, May 16-19, 2010, pp. 1-5.
Nádas, Szilveszter et al., "HSPA Transport Network Layer Congestion Control", Ericsson Research, Traffic Analysis and Network Performance Laboratory, Laborc u. 1, 1037 Budapest, Hungary, Aug. 11, 2009, pp. 1-43.
Racz, Andras et al., "Handover Perforamnce in 3GPP Long Term Evolution (LTE) Systems", 16th IST Mobile and Wireless Communications Summit, Budapest, Hungary, Jul. 1-5, 2007, pp. 1-5.
Author Unknown, "Principles for Intra Frequency Load Balancing", Huawei; 3GPP TSG RAN WG3 Meeting #60; R3-081163; May 5-9, 2008. pp. 1-4. Kansas City, Missouri, US.

*Primary Examiner* — Kwang B Yao
*Assistant Examiner* — Adam Duda
(74) *Attorney, Agent, or Firm* — Murphy, Bilak & Homiller, PLLC

(57) ABSTRACT

A technique for cable interface-based load balancing between first and second cells is described. Each cell comprises cable and air interfaces defining a parameter set comprising load statuses of the cable and air interfaces. A method aspect being performed in a control entity comprises the steps of determining, in the first cell, the parameter set of the first cell, obtaining the parameter set of the second cell, determining whether the load statues of the cable and air interfaces of the first cell are low, whether the air interface load status of the second cell is low, and whether the cable interface load status of the second cell is high, and reconfiguring, if a result of the determination is affirmative, at least one air interface configuration parameter of the first cell so as to off-load at least a part of mobile-originated traffic from the second cell to the first cell.

35 Claims, 14 Drawing Sheets

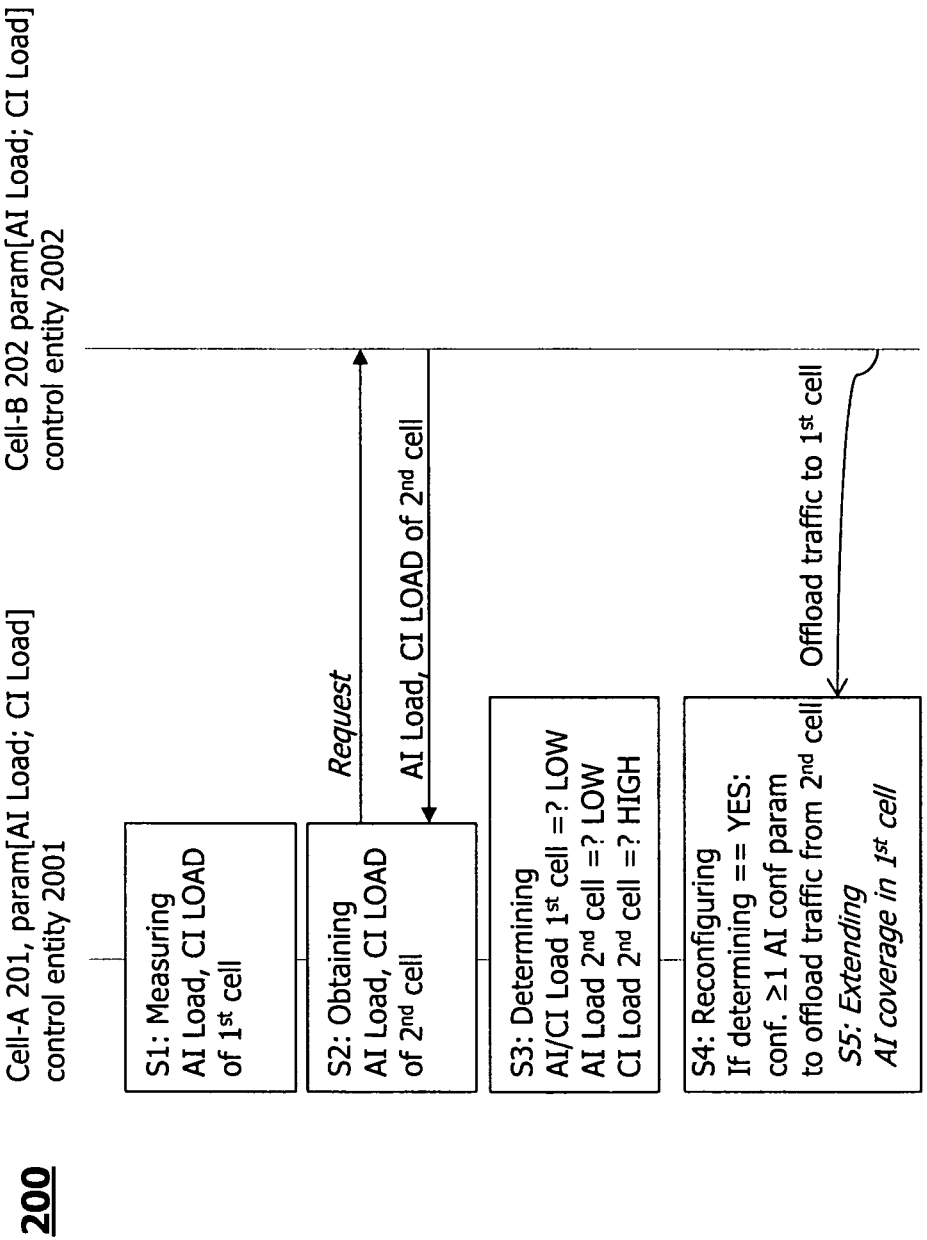

TECHNIQUE FOR CABLE INTERFACE-BASED LOAD BALANCING BETWEEN CELLS

TECHNICAL FIELD

The present disclosure generally relates inter-cell load balancing. Specifically, a cable interface-based load balancing between at least a first cell and a second cell in a mobile communication network is described.

BACKGROUND

The concept of Self-Optimizing Networks (SONs) in Long Term Evolution (LTE) has been proposed recently as a means to dynamically optimize the network performance, to minimize manual configurations and to reduce the overall cost of operating a network. Optimizing radio network configuration is an important task to increase the network efficiency and to improve user performance at the same time.

The main motivation for utilizing SONs basically resides in the large number of complex network parameters as well as the high number of base stations (or cells defined by the base stations) that need to be managed and configured with minimized human interaction. There are multiple parameters that can be optimized in a radio network, comprising various cell parameters, such as antenna settings (e.g., tilt and/or azimuth), radio network parameter settings (handover, load balancing, interference coordination, etc.), scheduler parameter setting, etc. The aim of the SON concept is to optimize these parameters, some of which will exemplarily be described herein below in more detail.

The handover (HO) procedure is one of the most important functionalities of a mobile communication system. In LTE, unlike in Wideband Code Division Multiple Access (WCDMA), there is no soft handover support, and at each handover the user context, including user plane packets and control plane context, need to be relocated from one eNodeB (eNB) to the other.

It is an option whether the full protocol status of the source eNB is transferred to the target eNB or the protocols are reinitialized after the handover. The standardized X2 interface enables to transfer both the control and user plane messages and the user plane data by enabling packet forwarding between the source and target eNBs. The HO decision is based on the UE Radio Resource Control (RRC) measurement report (so-called A3 events).

Electrical antenna tilt is another important cell parameter which can be optimized in a radio network. This parameter is usually determined at time of network planning based on the support of various network planning tools. Later it can be tuned based on, for instance, drive tests in the network area or on the recently introduced concept of Minimization of Drive Tests (MDT) from $3^{rd}$ Generation Partnership Project (3GPP), which allows configuring regular UEs to perform certain measurements and collect these measurements in the Operation and Maintenance (OAM) system for various network optimization purposes.

Load balancing (LB) is one of the SON functions in LTE aiming to offload overloaded cells (e.g., with high traffic demand) to less loaded neighbor cells. LB shares for example the load of the radio links among cells based on longer time scale statistics (hourly or daily basis) by changing the cell borders. LB can be configured either with HO parameter settings or with antenna settings. In 3GPP, the HO offset parameter can be used for this purpose on a cell level which is triggered when the HO measurement report is performed (and thereby implicitly triggers the actual HO as well), although it is also possible to manage handovers for example per user equipment (UE).

The LB processing can be run for example in the so-called Network Management System (NMS) for centralized solutions and also in the so-called Network Element (NE) for distributed solutions. However, if short time scale LB methods are to be planned for NE (e.g., in the eNodeB) implementation, the two LB schemes (long scale and short scale) may coexist and inter-work using for example the standardized interface Interface-N.

FIG. 1 shows an exemplary context of a Radio Access Network (RAN) 100. It is to be noted that in the following, doubled reference signs (such as 1003, 1004) designate the corresponding component to belong to a first cell and/or a second cell (see FIG. 2 ff). The RAN 100 comprises a Transport Network (TN) 1003, 1004. For example, the TN may be realized via an S1 interface in LTE or as an Iub interface in High Speed Packet Access (HSPA). The RAN 100 further comprises a Radio Base Station (RBS) site 1001, 1002 for providing base station functionality and a Switch Site 1005 for providing access to, for example, the Internet. In turn the RBS site 1001, 1002 may be comprised of one or more of a Base Station (BS), a Base Transceiver Station (BTS), a NodeB and an eNB, and an Internet Protocol (IP) RAN for interfacing between the TN 1003, 1004 and the B(T)S/(e)NB. Further, the IP RAN may comprise a Radio Bearer Control (RBC) Site for providing functionalities such as Ethernet switching, IP routing and security.

For the purpose of this entire description, the terms BS, BTS, NodeB and eNB may be used interchangeably for providing a mobility anchor for any UE camping in the B(T)S/(e)NB. As long as the mobility anchor function is fulfilled, the terms BS, BTS, NodeB and eNB only mean implementation of substantially the same mobility anchor function in different environments.

The TN 1003, 1004 may be implemented as a so-called Mobile Backhaul involving cable-bound (e.g., via wire, such as a copper line, or a fiber line) or wireless (e.g., via microwave) coupling into a so-called Metro Ethernet. Lastly, the Switch Site 1005 serves for interfacing between the TN 1003, 1004 and the Internet and/or a Public Switched Telephone Network (PSTN), and may comprise another IP RAN, which IP RAN in turn may comprise a Base Station Controller (BSC)/Radio Network Controller (RNC) site. The BSC/RNC Site may provide functionalities such as network synchronization, Ethernet switching, IP Routing and security.

FIG. 2 shows a first approach for LB. The above-described network 100 may comprise a first cell (Cell-A, 1001) and a second cell (Cell-B, 1002). Note that the terms "cell" and "Base Station" (defining the cell) may be used interchangeably. Cell A 1001 and/or cell B 1002 may comprise the RBS Site described in conjunction with FIG. 1 (if necessary). Further, whereas the BSs/cells are depicted by an antenna pole/tower, this does not foresee any particular implementation.

Cell/BS A 1001 has a default coverage 101 (depicted by a solid line), and cell/BS B 1002 has a default coverage 102 (depicted by a solid line). As shown in FIG. 2, cell/BS A 1001, in the default coverage, may anchor only one UE (UE6), whereas cell/BS B 1002 may have to anchor five UEs (UE1 to UE5).

LB may be employed as a means to balance resources among entities if the following conditions hold:
  The air interface of cell/BS B 1002 is overloaded.
  No transport network bottleneck in cell/BS A 1001 arises, since for example a cable interface is used.

If both conditions are fulfilled, cell/BS A 1001 may be re-configured to extend its coverage 101 (see dashed line). In this case, cell/BS B 1002 may be enabled to offload at least two UEs (UE4 and UE5) to cell/BS A 1001. Accordingly, after LB, each cell/BS 1001, 1002 would equally anchor three UEs (UE4 to UE6 for cell A 1001, and UE1 to UE3 for cell B).

FIG. 3 shows a second approach for LB. In FIG. 3, in a default coverage, a macro cell/BS 1001 may have to anchor all UEs (UE1 to UE9). Offloading the macro cell/BS 1001 may be performed, for example, with micro sites (as provided, e.g., in so-called HetNets). Accordingly, a micro cell/BS 1002 may assist in absorbing high capacity demands if the following conditions are true:

The air interface of the macro cell/BS 1001 is overloaded.

No transport network bottleneck in the micro cell/BS 1002 arises, for example since a cable interface is used.

If both conditions are fulfilled, the micro cell/BS 1002 may be re-configured to overtake all UEs in the coverage of the micro cell/BS 1002. In this case, the macro cell/BS 1001 may be enabled to offload at least four UEs (UE1 to UE4) to the micro cell/BS 1002. Accordingly, after LB, the load would be more evenly distributed (UE1 to UE4 for the micro cell/BS 1002, and UE5 to UE9 for the macro cell/BS 1001).

FIG. 4 shows a third approach for LB, wherein the left-hand part of FIG. 4 shows the situation before LB, and the right-hand part of FIG. 4 shows the situation after LB. As shown in FIG. 4, before LB, cell/BS B 1002 is congested with anchoring three UEs (UE1 to UE3), whereas cell/BS A 1001 has to anchor only one UE (UE4). Accordingly, TN LB performs load balancing among TN links by rerouting some part of the traffic of the overloaded TN link (of cell/BS B 1002) toward the less loaded TN link (of cell/BS A 1001). In this case, the situation after LB may reside in having added an extra direct transport link between the cell/BS 1002 with overloaded TN link and the neighbor cell/BS 1001 with less loaded TN link.

However, the third approach can be extremely costly due to the additional TN link required. Furthermore, using this approach, the air interface can still remain unutilized. In this case, the following conditions hold:

The air interface of the cell/BSs 1001, 1002 are NOT overloaded.

Transport network links constitute a bottleneck, since interfaces with low throughput are used (e.g., copper line and/or microwave).

The above third approach has the drawback of requiring the extra TN link between the cells/BSs 1001, 1002 in order to reroute the traffic of at least some UEs. In addition, the deployment of the extra TN link may not be feasible due to practical constraints (e.g., license is denied to deploy the new cable or microwave link).

Accordingly, the TN remains often as a bottleneck, even today. In case of TN congestion, TN congestion control may determine the resource balancing, and not the air interface scheduling. In the LTE TN (implemented, e.g., as the S1 interface), the end-user Transport Control Protocol (TCP) congestion control is used as a congestion control mechanism. If TN remains a potential bottleneck, then a need for a solution to handle this bottleneck arises. In this case, TN congestion control has to be able to realize the desired resource balancing. For instance, operators may need to be supported in LTE over a TN involving 8 T1 trunks (resulting in only ~12 Mbps TN capacity).

SUMMARY

There is a need for an efficient LB technique among cells in a mobile communication network.

In a first aspect, a method for cable interface-based load balancing, LB, between a first cell and a second cell in a mobile communication network is provided, each cell comprising at least a cable interface and an air interface, and each cell being associated with a parameter set comprising a load status of the air interface and a load status of the cable interface of the respective cell, the method being performed in a control entity of the first cell and comprising the steps of determining, the parameter set of the first cell, obtaining the parameter set of the second cell or information indicative thereof, determining whether the air interface load status and cable interface load status of the first cell are low, whether the air interface load status of the second cell is low, and whether the cable interface load status of the second cell is high, and reconfiguring, if a result of the determination is affirmative, at least one air interface configuration parameter of the first cell so as to off-load at least a part of mobile-originated traffic from the second cell to the first cell.

According to the first aspect, the at least one air interface reconfiguration parameter may be at least one handover parameter. In this case, the at least one handover parameter may be a handover offset parameter. Alternatively or in addition, the at least one air interface reconfiguration parameter may an antenna tilt of a base station of the first cell. Alternatively or in addition, the at least one air interface reconfiguration parameter is a transmit power of a base station of the first cell. That is, the first cell can be re-configured by any means necessary to adapt to the current needs. For instance, in a situation where the antenna tilt is not re-configurable (since, e.g., the antenna tilt is fixed), still at least one of the remaining parameters can be re-configured accordingly.

According to a first refinement of the first aspect, the mobile-originated traffic may stem from at least one user equipment to be off-loaded from the second cell to the first cell. In this case, offloading traffic can be quantized per UE, which means that no selection of transport streams, bearers or the like must be performed, but simply all traffic stemming from a particular UE can be off-loaded.

According to a second refinement of the first aspect, the step of reconfiguring may further comprise extending air interface coverage of the first cell. In this case, the air interface coverage may be increased dependent on the cable interface load status in the first cell. Moreover, the air interface coverage may be increased dependent on an amount of traffic the first cell is capable to off-load from the second cell. That is, "enlarging the cell" (i.e., extending air interface coverage) may enable a simple tool for reconfiguration, since usually any cell allows for a margin (e.g., in transmit power) for changing the cell coverage.

When combining the first and second refinements, the air interface coverage may be increased dependent on a number of the cell-edge user equipments in at least one of the first and second cells. Further, the air interface coverage may be increased dependent on average traffic per user equipment in the second cell. Moreover, the air interface coverage may be defined by cell borders of the first cell. In the latter case, the cell borders may be determined by one of a circle and a honeycomb centred on a base station of the first cell. This approach is advantageous in that UEs in an overlapping area of the increased first cell's coverage and the second cell's coverage may be offloaded from the second cell to the first cell, which saves on system resources since those cell-edge users are typical HO candidates anyway, even in the case where none of the first and second cells are overloaded.

According to a third refinement of the first aspect, the method may further comprise receiving an indication from the second cell whether the second cell is to perform the cable interface-based LB. According to this refinement, in one example, a race or deadlock of the LB between the first cell and the second cell is avoided, as only one of the first and second cells is to perform TN LB.

In the above third refinement, the method may further comprise, if the received indication is negative, performing a first comparing step so as to determine whether the cable interface load status of the first cell is smaller than a first threshold, and increasing air interface coverage of the first cell by a first amount if the determination in the first comparing step is positive. In the latter case, the first threshold may be approximately 50% of the full capacity of the cable interface of the first cell, and the first amount may be an increase of approximately 20% of a radius of the first cell.

Moreover, if the determination in the first comparing step is negative, there may be further steps of performing a second comparing step so as to determine whether the cable interface load status of the first cell is smaller than a second threshold, and increasing air interface coverage of the first cell by a second amount if the determination in the second comparing step is positive. In the latter case, the second threshold may be greater than the first threshold, and the second amount may be smaller than the first amount. To be more precise, the second threshold may be approximately 80% of the full capacity of the cable interface of the first cell, and the second amount may be an increase of approximately 10% of a radius of the first cell.

If the determination in the second comparing step is negative, there may be steps of decreasing air interface coverage of the first cell by a third amount. In the latter case, the decrease of the third amount may be, as an absolute, equal to the increase of the second amount, preferably, the third amount is a decrease of approximately 10% of a radius of the first cell. Accordingly, it may be ascertained that there is a granularity in the increase of the first cell's coverage depending on the load of the first cell, which in turn makes sure that the first cell does not accept an overly big amount of off-load traffic.

In a fourth refinement, the determining step may be performed based on one or more threshold decisions, for example by comparing the air interface load status and cable interface load status of the first cell and the air interface load status and cable interface load status of the second cell with at least one threshold each. If so, the at least one threshold may comprises a first threshold, a second threshold, a third threshold, and a fourth threshold, and wherein the third threshold is greater than the maximum of the first, second and fourth thresholds.

As an example, the determining step may comprise a first comparing step so as to determine whether the cable interface load status of the first cell is greater than the first threshold, a second comparing step so as to determine whether the air interface load status of the first cell is greater than the second threshold, a third comparing step so as to determine whether the cable interface load status of the second cell is greater than the third threshold, a fourth comparing step so as to determine whether the cable interface load status of the second cell is greater than the fourth threshold, and returning an affirmative result if all of the following conditions are fulfilled: the determination in the first comparing step is negative, the determination in the second comparing step is negative, the determination in the third comparing step is positive, and the determination in the fourth comparing step is negative. In this case, the first threshold may be approximately 80% of the full capacity of the cable interface of the first cell, the second threshold may be approximately 50% of the full capacity of the air interface of the first cell, the third threshold may be approximately 90% of the full capacity of the cable interface of the second cell, and/or the fourth threshold may be approximately 60% of the full capacity of the air interface of the second cell. Accordingly, it is possible to fully analyse the load statuses (on both interfaces) of the first and second cells so as to make an informed decision on when to switch on the TN LB.

In a fifth refinement, the determining step may comprise a first comparing step so as to determine whether the air interface load status of the first cell is greater than a first threshold, a second comparing step so as to determine whether the air interface load status of the second cell is greater than a second threshold, and returning a declining result if at least one of the determinations in the first and second comparing steps is positive. In that case, the first threshold may be approximately 80% of the full capacity of the air interface of the first cell, and the second threshold may be approximately 80% of the full capacity of the air interface of the second cell. Alternatively or in addition, the determining step may comprise a first comparing step so as to determine whether the cable interface load status of the first cell is smaller than a first threshold, a second comparing step so as to determine whether the cable interface load status of the second cell is smaller than a second threshold, and returning a declining result if both of the determinations in the first and second comparing steps are positive. In the latter case, the first threshold may be approximately 50% of the full capacity of the cable interface of the first cell, and the second threshold may be approximately 50% of the full capacity of the cable interface of the second cell.

Alternatively or in addition, the determining step may comprise calculating a quotient, the dividend being a difference, and the divisor being the cable interface load status of the first cell, wherein the minuend of the difference is the cable interface load status of the first cell and the subtrahend of the difference is the cable interface load status of the second cell, a comparing step so as to determine whether the calculated quotient is greater than a threshold, and returning a declining result if the determination in the comparing step is positive. In the latter case, the threshold may approximately 10% of the full capacity of the cable interface of the first cell. Further, if the result is declining, there may be a step for resetting the at least one air interface configuration parameter of the first cell to its original state.

Accordingly, there may be provided a sophisticated method for switching off TN LB involving several independent alternatives. In this way, it is ascertained that there is a leverage between the needs of the first cell and of the second cell: on the one hand, it is ascertained that TN LB is switched off as soon as the first cell is to accept more off-load traffic than it can handle; on the other hand, it is ascertained that TN LB is switched off as soon as the second cell does not need TN LB anymore.

Finally, in a sixth refinement, the obtaining and determining steps may be performed periodically (e.g. every 10 seconds). The load statuses may be determined by the measured utilizations. In this way, it is ascertained that all decisions (switching on/off TN LB, etc.) are based on current values of the load statuses.

In a second aspect, a computer program product is provided, the computer program product comprising program code portions for performing any of the method aspects disclosed herein when the computer program product is executed on one or more computing devices (e.g., on the control entity of the BS/cell). The computer program product may be stored on a computer readable recording medium.

In a third aspect, there is provided a control entity for a first cell for cable interface-based load balancing, LB, between the first cell and a second cell in a mobile communication network, each cell comprising at least a cable interface and an air interface, and each cell being associated with a parameter set comprising a load status of the air interface and a load status of the cable interface of the respective cell, wherein the control entity for the first cell comprises at least one processor configured to determine the parameter set of the first cell, obtain the parameter set of the second cell or information indicative thereof, determine whether the air interface load status and cable interface load status of the first cell are low, whether the air interface load status of the second cell is low, and whether the cable interface load status of the second cell is high, and reconfigure, if a result of the determination is affirmative, at least one air interface configuration parameter of the first cell so as to off-load at least a part of the mobile-originated traffic from the second cell to the first cell.

The control entity may be part of or constitute a Network Element (NE), a B(T)S/(e)NB and/or a Network Management System (NMS).

In a fourth aspect, a system is provided, comprising at least the first cell and the second cell, wherein each of the first and second cells comprises the control entity of the third aspect.

It is to be noted that the control entity (and/or the system) may implement any of the technical details set forth for the method aspect hereinabove, and thus achieves the same advantages. In other words, the control entity may comprise further components adapted to perform any of the method steps disclosed herein.

BRIEF DESCRIPTION OF THE DRAWINGS

The embodiments of the present disclosure are described herein below with reference to the accompanying drawings, in which:

FIG. 7 shows a flow diagram illustrating an embodiment of a method for cable interface-based load balancing between at least a first cell and a second cell;

FIG. 9B shows a practical example under which conditions the Transport Network Load Balancing is switched on;

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, while the embodiments will primarily be described in the context of the control entity; however, this does not rule out the use of less or more devices to implement the present technique.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
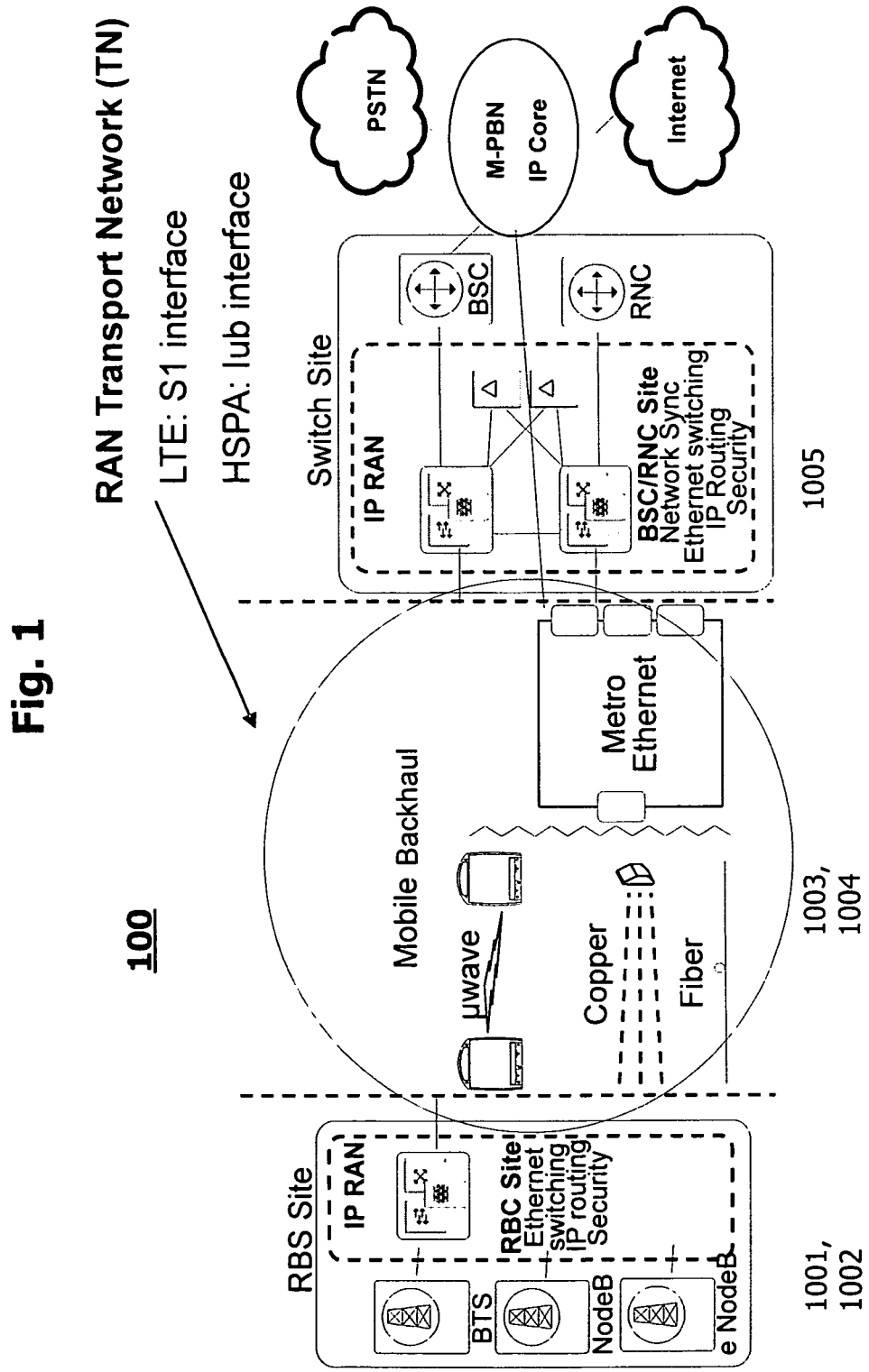
FIG. 1 shows a Transport Network and an associated Radio Access Network.
Figure 2:
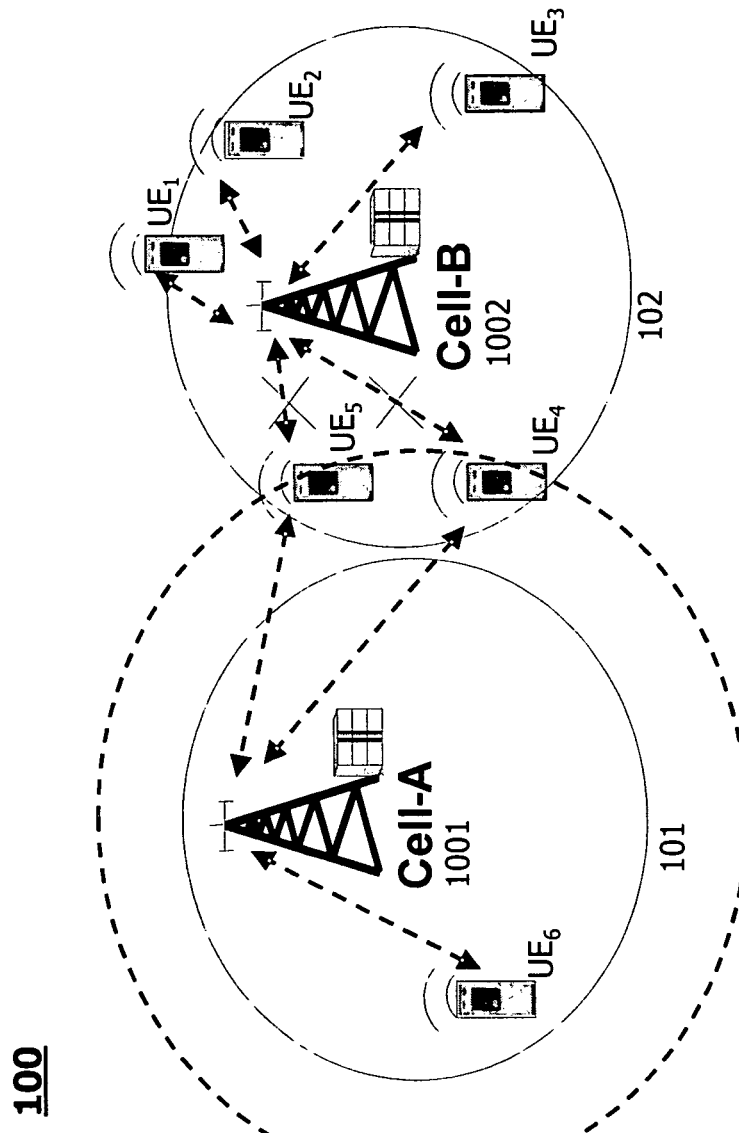
FIG. 2 shows a first approach for Load Balancing.
Figure 3:
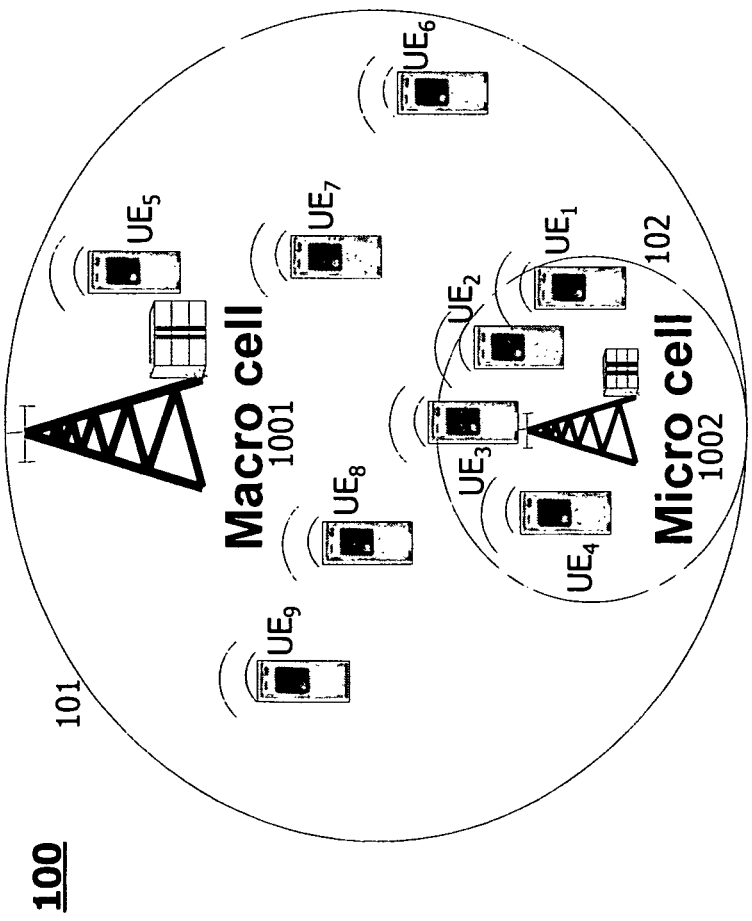
FIG. 3 shows a second approach for Load Balancing.
Figure 4:
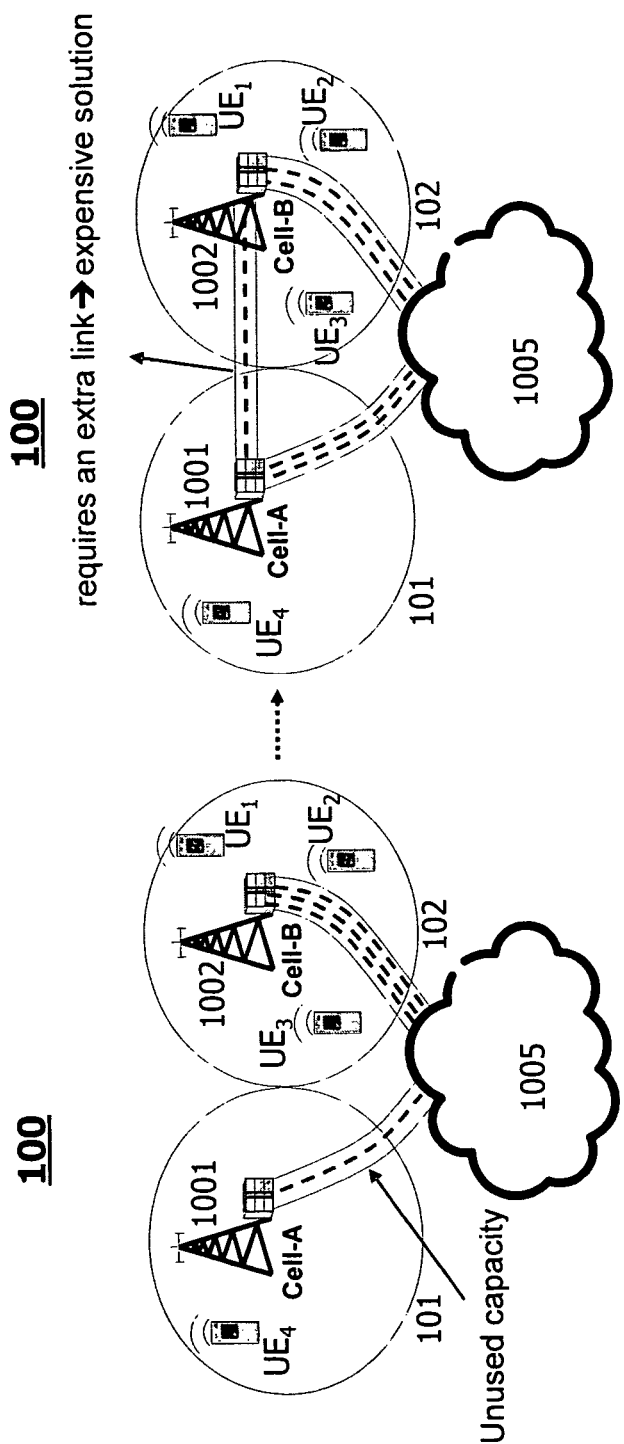
FIG. 4 shows a third approach for Load Balancing.

Note that in the entire description, any reference to the network (e.g., Internet) "cloud" 2005 may involve the interfacing switch site (depicted in FIG. 1) as needed. It is further to be noted that there may be more than one meaning of TN LB. For instance, TN LB may also relate to extra links between the RBS Site and the Switch Site (or Core network), or may relate to extra links between cells. Actually both of them belong to LB of TN.

Figure 5:
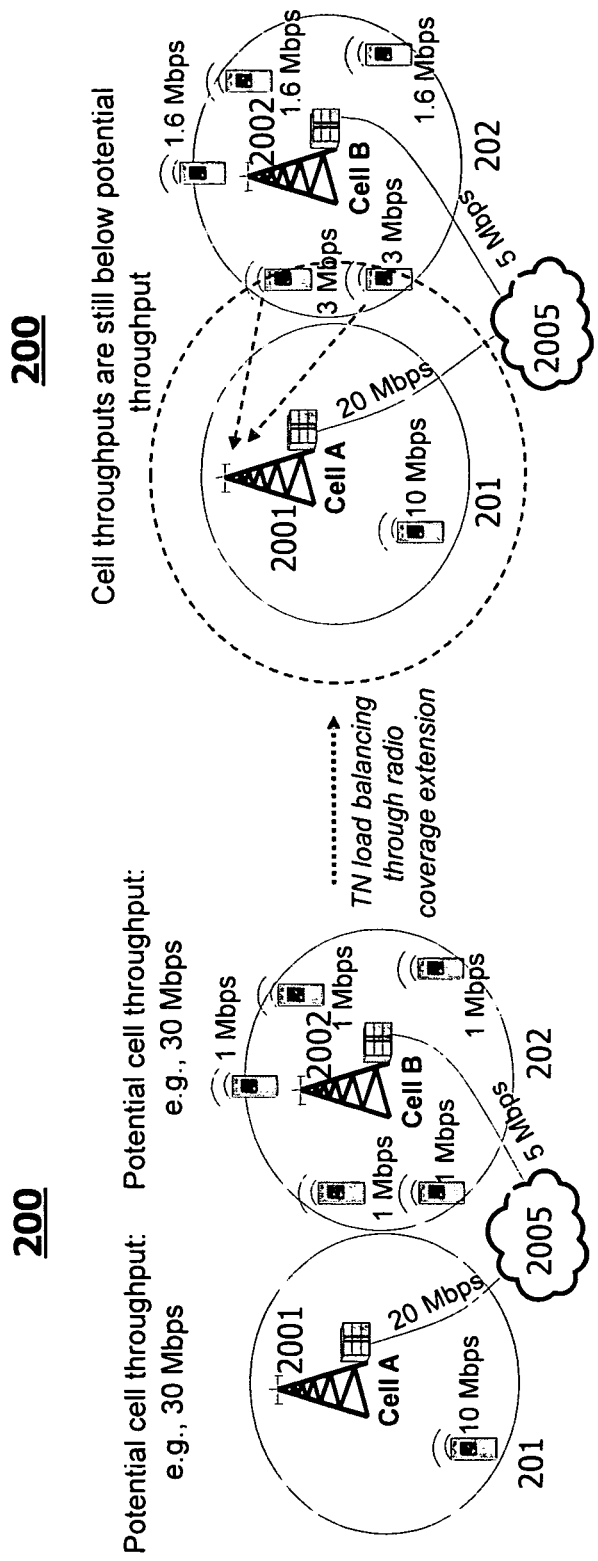
FIG. 5 schematically shows an embodiment of Transport Network Load Balancing.

FIG. 5 schematically shows an embodiment of Transport Network Load Balancing (TN LB). As is shown in FIG. 5, a communication network 200 comprises a first cell/BS 2001 (Cell-A, involving a control entity) and a second cell/BS 2002 (Cell-B, involving a control entity). The left-hand part of FIG. 5 shows the situation before TN LB, and the right-hand part of FIG. 5 shows the situation after LB. Both the first and second cells 2001, 2002 respectively have a coverage area 201, 202 before TN LB (solid lines) and after TN LB (dashed line).

As shown in FIG. 5, the network 200 may comprise the first cell (Cell-A, 2001) and the second cell (Cell-B, 2002). Note that the terms "cell" and "Base Station" (defining the cell) may be used interchangeably. Accordingly, cell A 2001 and/or cell B 2002 may comprise the RBS Site described in conjunction with FIG. 1 (if necessary). Further, whereas the BSs/cells are depicted by an antenna pole/tower, this does not foresee any particular implementation. Further, cell A 2001 has a default coverage 201 (depicted by a solid line), and cell B 2002 has a default coverage 202 (depicted by a solid line).

The main idea of the TN LB embodiment illustrated in FIG. 5 may be summarized as follows: if there is a cell with unutilized radio and transport links and it has a neighbor with high transport link utilization, but its radio interface is unutilized, then reconfigure the radio parameters (e.g., HO parameters and/or antenna tilt) of the cell such that the cell extends its coverage and takes over UEs (i.e., traffic) from the neighbor cell. The UEs may be any stationary or mobile terminals. As an example, an individual UE may be realized in the form of a mobile (smart-)phone, a notebook computer, a laptop, a subnotebook, a Personal Digital Assistant (PDA), a tablet PC (such as an iPad™), or any hybrids thereof (for example, a Blackberry™ being a hybrid of a smartphone and a PDA), and the like.

In detail, as shown in FIG. 5, before TN LB, cell B 2002 is congested with anchoring five UEs, whereas cell A 2001 has to anchor only one UE. Each one of the first and second cells may have a (theoretical) potential air throughput of, for example, 30 Mbps. Further, the first cell 2001 may have a cable throughput of, for example, 20 Mbps to the network 2005, and the second cell 2002 may have a cable throughput of, for example, 5 Mbps to the network 2005. Furthermore, in this example, one UE (in cell A 2001) has a maximum air throughput of 10 Mbps, whereas the other UEs (in cell B 2002) each have a maximum air throughput of 3 Mbps. Accordingly, before cable-interface based LB, the first cell 2001 fully supports (i.e., both air and cable) the UE with 10 Mbps, since a cable throughput of 20 Mbps is available. However, the second cell 2002 must fairly arbitrate between the five UEs, so that each UE receives only 1 Mbps of the available 5 Mbps TN throughput (although 30 Mbps of air throughput would be possible).

Accordingly, if the first cell A 2001 determines that cell A 2001 has (substantially) unutilized air and cable links, and that cell B 2002 has high cable interface utilization, but a (substantially) unutilized air interface, TN LB may be performed, for example, by extending coverage of the first cell, which leads to the situation after TN LB.

In detail, as shown in FIG. 5, after TN LB, cell B 2002 still has to anchor three UEs, whereas cell A 2001 has to anchor three UEs as well. As for the cell A 2001, the control entity must fairly arbitrate between the new two UEs. In the present example, this is no problem, as the two new UEs add 6 Mbps of cable throughput, resulting in a total of 16 Mbps of throughput still below the available 20 Mbps cable throughput. As for cell B 2002, the situation after TN LB may still not be optimal, but has significantly improved: cell B 2002 now has to fairly arbitrate between the remaining three UEs. The fairest solution resides in providing each of the three UEs with the equal cable throughput of 1.6 Mbps, resulting in a total cable load of 4.8 Mbps (0.2 Mbps might be saved e.g. for emergency calls). Still, each of the three UEs cannot be anchored with 3 Mbps, but at least each UE in cell B 2002 experiences a 60% increase in cable throughput (as compared to the situation before TN LB).

Figure 6:
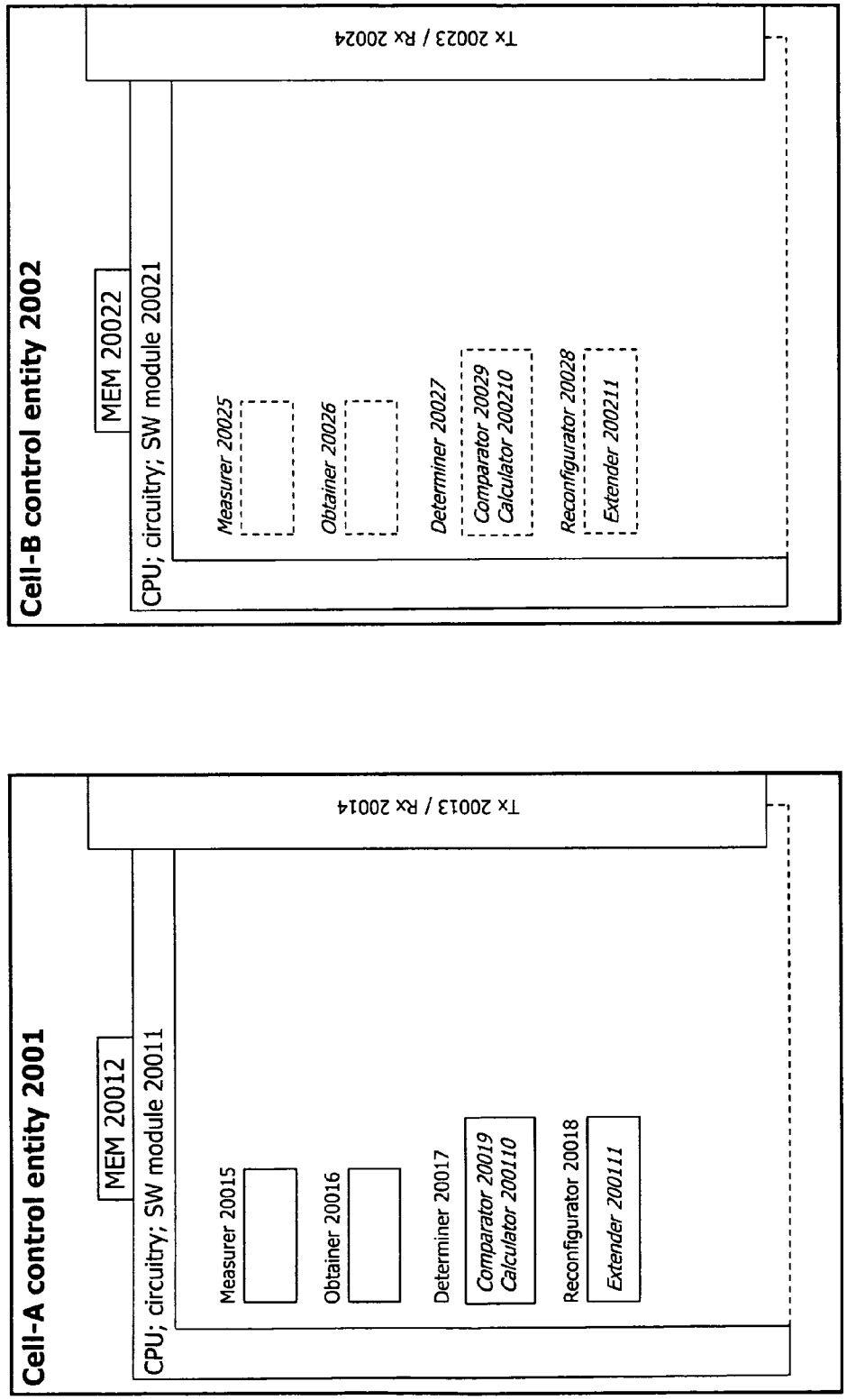
FIG. 6 shows the components comprised in an exemplary apparatus embodying a control entity.

FIG. 6 shows an embodiment of a control entity 2001 for cable interface-based load balancing between at least a first cell and a second cell in a mobile communication network (e.g., as discussed above in connection with FIG. 5). Specifically, FIG. 6 illustrates the components comprised in the control entity 2001 of cell A. It is to be noted that substantially the same components may be present in a control entity 2002 of cell B also shown in FIG. 6, and vice versa.

As shown in FIG. 6, the control entity 2001 comprises a core functionality (e.g., a central processing unit (CPU), a dedicated circuitry and/or a software module) 20011, a memory (and/or database) 20012, a transmitter 20013 and a receiver 20014. In turn, the core functionality 20017 comprises a measurer 20015, an obtainer 20016, a determiner 20017, a reconfigurator 20018, an optional comparator 20019, an optional calculator 200110 and an optional extender 200111.

As shown in FIG. 6, the control entity 2002 comprises a core functionality (e.g. a CPU, a dedicated circuitry or a software module) 20021, a memory (and/or database) 20022, a transmitter 20023 and a receiver 20024. In turn, the core functionality 20021 comprises a measurer 20025, an obtainer 20026, a determiner 20027, a reconfigurator 20028, an optional comparator 20029, an optional calculator 200210 and an optional extender 200211.

As indicated by the dashed extensions of the functional blocks of the CPUs 200x1 (wherein x=1 and/or 2), the measurer 20015, the obtainer 20016, the determiner 20017, the reconfigurator 20018, the comparator 20019, the calculator 200110 and the extender 200111 (of the control entity 2001) and the measurer 20025, the obtainer 20026, the determiner 20027, the reconfigurator 20028, the comparator 20029, the calculator 200210 and the extender 200211 (of the control entity 2002) as well as the memory 200x2, the transmitter 200x3 and the receiver 200x4 may at least partially be functionalities running on the CPUs 200x1, or may alternatively be separate functional entities or means controlled by the CPU 200x1 and supplying the same with information.

The CPUs 200x1 may be configured, for example by software residing in the memories 200x2, to process various data inputs and to control the functions of the memory 200x2, the transmitter 200x3 and the receiver 200x4 (as well as the measurer 20015, the obtainer 20016, the determiner 20017, the reconfigurator 20018, the comparator 20019, the calculator 200110 and the extender 200111 (of the control entity 2001) and the measurer 20025, the obtainer 20026, the determiner 20027, the reconfigurator 20028, the comparator 20029, the calculator 200210 and the extender 200211 (of the control entity 2002)). The memory 200x2 may serve for storing code means for carrying out the methods according to the aspects disclosed herein, when run on the CPU 200x1.

It is to be noted that the transmitter 200x3 and the receiver 200x4 may alternatively be provided as an integral transceiver, as is shown in FIG. 6. It is further to be noted that the transmitters/receivers may be implemented as physical transmitters/receivers for transceiving via an air interface (e.g., between the two cells/control entities 2001 or 2002), as routing entities/interfaces between network elements (e.g., for interfacing with the network 2005 when disposed as separate network functionalities), as functionalities for writing/reading information into/from a given memory area (e.g. between a single control entity for the two cells 2001, 2002 when disposed as an integral network entity) or as any suitable combination of the above. At least one of the above-described measurer 20015, obtainer 20016, determiner 20017, reconfigurator 20018, comparator 20019, calculator 200110 and extender 200111 (of the control entity 2001) and measurer 20025, obtainer 20026, determiner 20027, reconfigurator 20028, comparator 20029, calculator 200210 and extender 200211 (of the control entity 2002), or the respective functionalities carried out, may also be implemented as a chipset, module or subassembly.

FIG. 7 illustrates an embodiment in the form of an overall method for cable interface-based load balancing between at least a first cell and a second cell in a mobile communication network. The method illustrated in FIG. 7 may be read in connection with the schematic diagram of FIG. 5.

In the signalling diagram of FIG. 7, signalling between elements is indicated in the horizontal direction, while time aspects between signalling are reflected in the vertical arrangement of the signalling sequence as well as in the sequence numbers. It is to be noted that the time aspects indicated in FIG. 7 do not necessarily restrict any one of the method steps shown to the step sequence outlined in FIG. 7. This applies in particular to method steps that are functionally disjunctive with each other; for example, when both control entities 2001 and 2002 of both cells A and B are configured according to the present embodiment (as shown in FIG. 8B below), "measuring" of cell A may supply the load statuses for the "obtaining" in cell B, and vice versa.

Figure 8A:
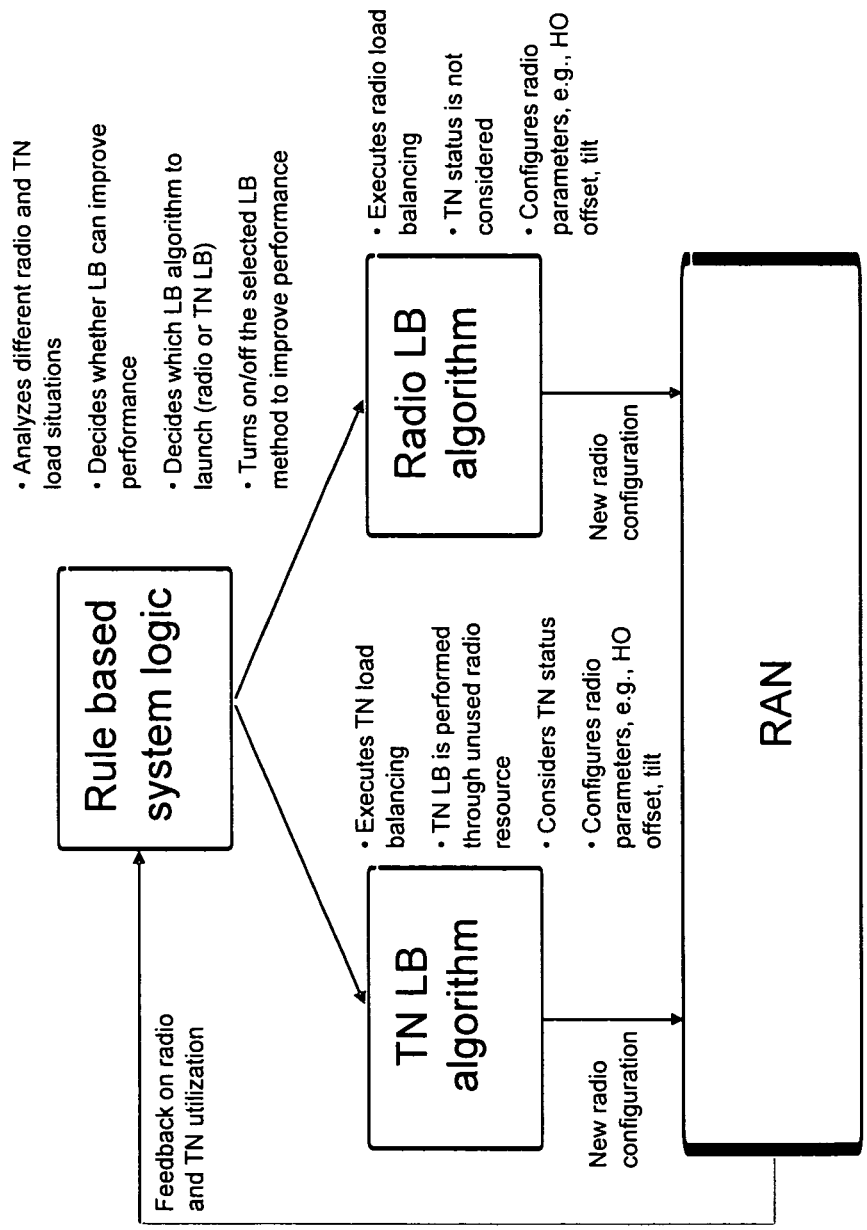
FIG. 8A shows an overview of the four processes, or methods, involved in an embodiment of Transport Network Load Balancing.

Before a detailed discussion of the four methods involved in TN LB, a brief overview of the interaction between the four methods is given. FIG. 8A shows the overview of the four methods involved in TN LB, whereas FIG. 8B shows the interaction between the first to fourth methods.

As shown in FIG. 8A, the basic concept of TN LB may be summarized by two parts: A first part, constituted, for example, by a rule-based system logic, controls when to switch on and off TN LB method. This corresponds to the first method for switching on TN LB, the second method for switching off TN LB, and the fourth method for re-setting the coverage after TN LB switch-off (see FIG. 8B). The second part comprises the third method for performing actual TN LB that is to re-configure, for example, cell coverage so as to adapt to the needs of the overloaded second cell 2002. The reconfiguration may balance the cable load through the air interface by reconfiguring e.g. the air network parameters of the first cell 2001.

Figure 8B:
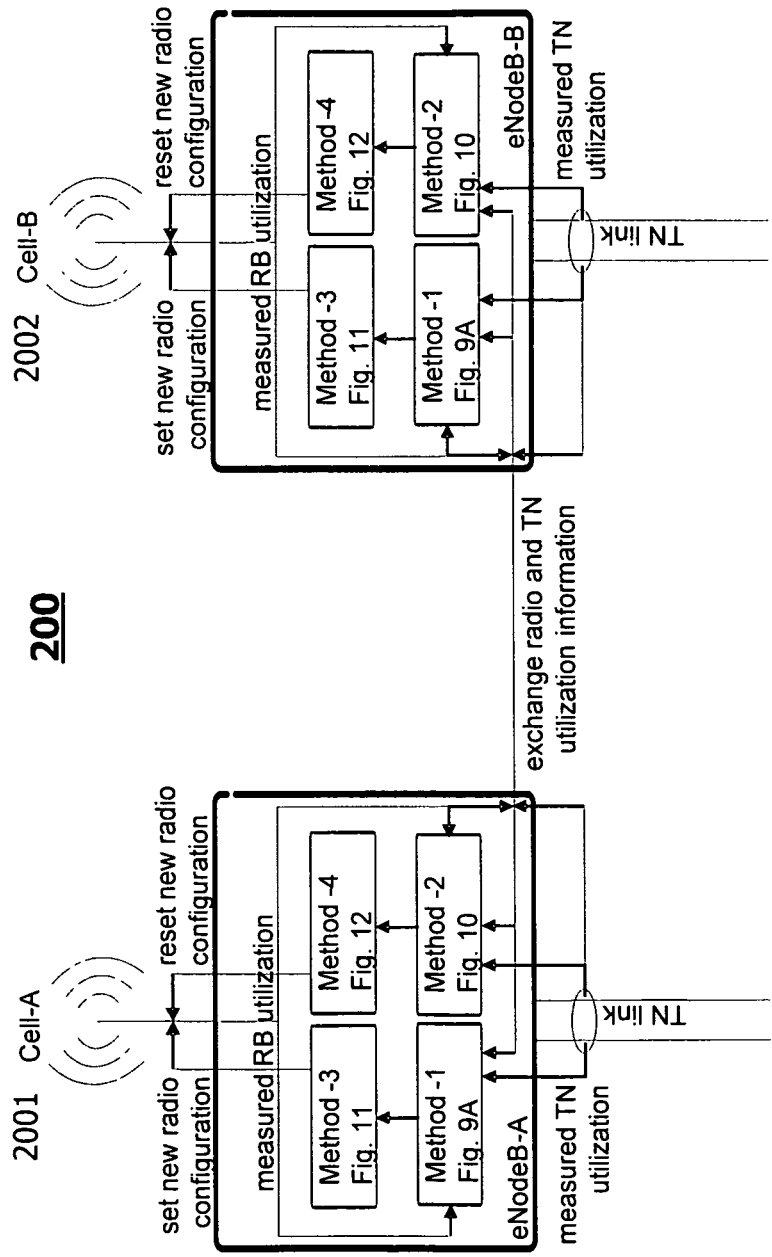
FIG. 8B shows an interaction between the first to fourth process of FIG. 8A.

FIG. 8B shows that the four methods may operate in the first cell 2001 as well as in the second cell 2002 basically in the same manner. As shown by the arrows "measured radio bearer (RB) utilization", "measured TN utilization" and "exchange radio and TN utilization information", the first method for switching on TN LB (described in detail herein below with reference to FIG. 9A) may be configured to base its switching-on decision on the load statuses of the first and second cells, namely the air interface/cable interface load status (e.g., measured RB/TN utilization of the first cell 2001 and the exchanged RB/TN utilization of the second cell 2002). After an affirmative decision of the first method, the third method for performing actual TN LB (described in detail herein below with reference to FIG. 11) may be launched to re-configure at least one air interface configuration parameter of the first cell 2001 (depicted by arrow "set new radio configuration").

Likewise, the second method for switching off TN LB (described in detail herein below with reference to FIG. 10) may be configured to base its switch-off decision on the same parameters as used for the first method. After an affirmative decision of the second method, the fourth method for re-setting the coverage after TN LB switch-off (described in detail herein below with reference to FIG. 12) may be launched so as to restore the original setting of the at least one air interface configuration parameter of the first cell 2001 (depicted by arrow "reset new radio configuration").

Turning back to the signalling diagram of FIG. 7 (to be read along with the control entity(ies) 2001 (and 2002) shown in FIG. 6), each cell comprises at least a cable interface and a air interface, and each cell is associated with a parameter set comprising the load status of the air interface and the load status of the cable interface of the respective cell.

In step S1, the measurer 20015 obtains, in the first cell, the parameter set of the first cell. Further, in step S2, the obtainer 20016 obtains the parameter set of the second cell or information indicative thereof. As mentioned above, the measurer 20025 and obtainer 20026 of the second control entity/cell 2002 may perform the same operations, so that the first and second control entities/cells supply one another with the necessary information/load statuses.

Then, in step S3, the determiner 20017 determines whether the air interface load status and cable interface load status of the first cell are low, whether the air interface load status of the second cell is low, and whether the cable interface load status of the second cell is high.

Figure 9A:
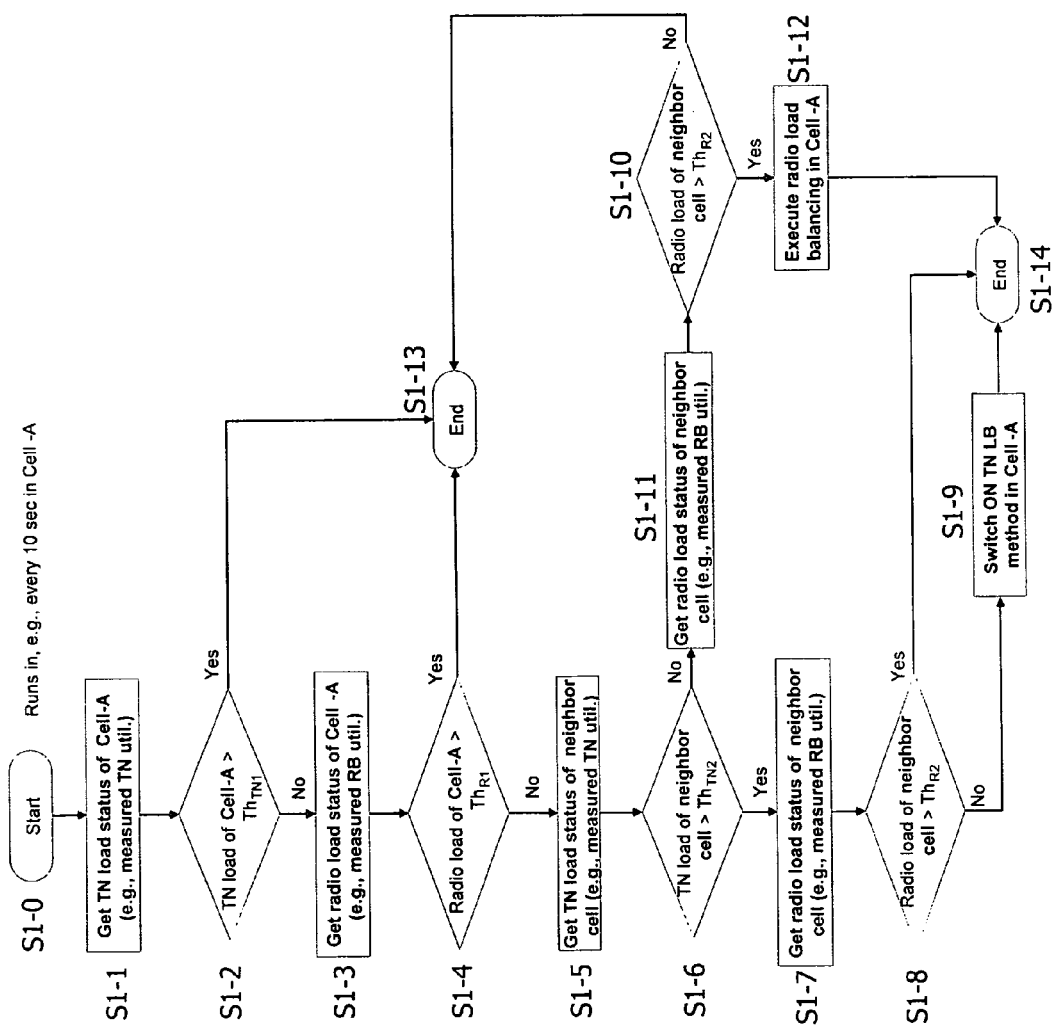
FIG. 9A illustrates the first process for switching on the Transport Network Load Balancing.

FIG. 9A shows in detail the first method for switching on TN LB. In an optional step S1-2, the comparator 20019 performs a first comparing step so as to determine whether the cable interface load status of the first cell is greater than a first threshold $Th_{TN1}$. If the result is negative, in step S1-4, the comparator 20019 performs a second comparing step so as to determine whether the air interface load status of the first cell is greater than a second threshold $Th_{R1}$. If the result is negative, in step S1-6, the comparator 20019 performs a third comparing step so as to determine whether the cable interface load status of the second cell is greater than a third threshold $Th_{TN2}$. If the result is positive, in step S1-8, the comparator 20019 performs a fourth comparing step so as to determine whether the cable interface load status of the second cell is greater than a fourth threshold $Th_{R2}$. If the result is negative, in step S1-9, the determiner 20017 returns an affirmative result, and thus, the TN LB is switched on for control entity/cell 2001.

Further, each comparing step S1-2, S1-4, S1-6 and S1-8 may be preceded by a respective step S1-1, S1-3, S1-5 and S1-7 in which the measurer 20015 or obtainer 20016 obtains the corresponding cable/air interface load status required for the subsequent comparing step. Still further, if only one of the above conditions is not fulfilled, the "direct chain" S1-0 to S1-9 is left (see S1-2, Yes; S1-4 Yes etc.), and the third TN LB method (described herein below) is not switched on.

Figure 9B:
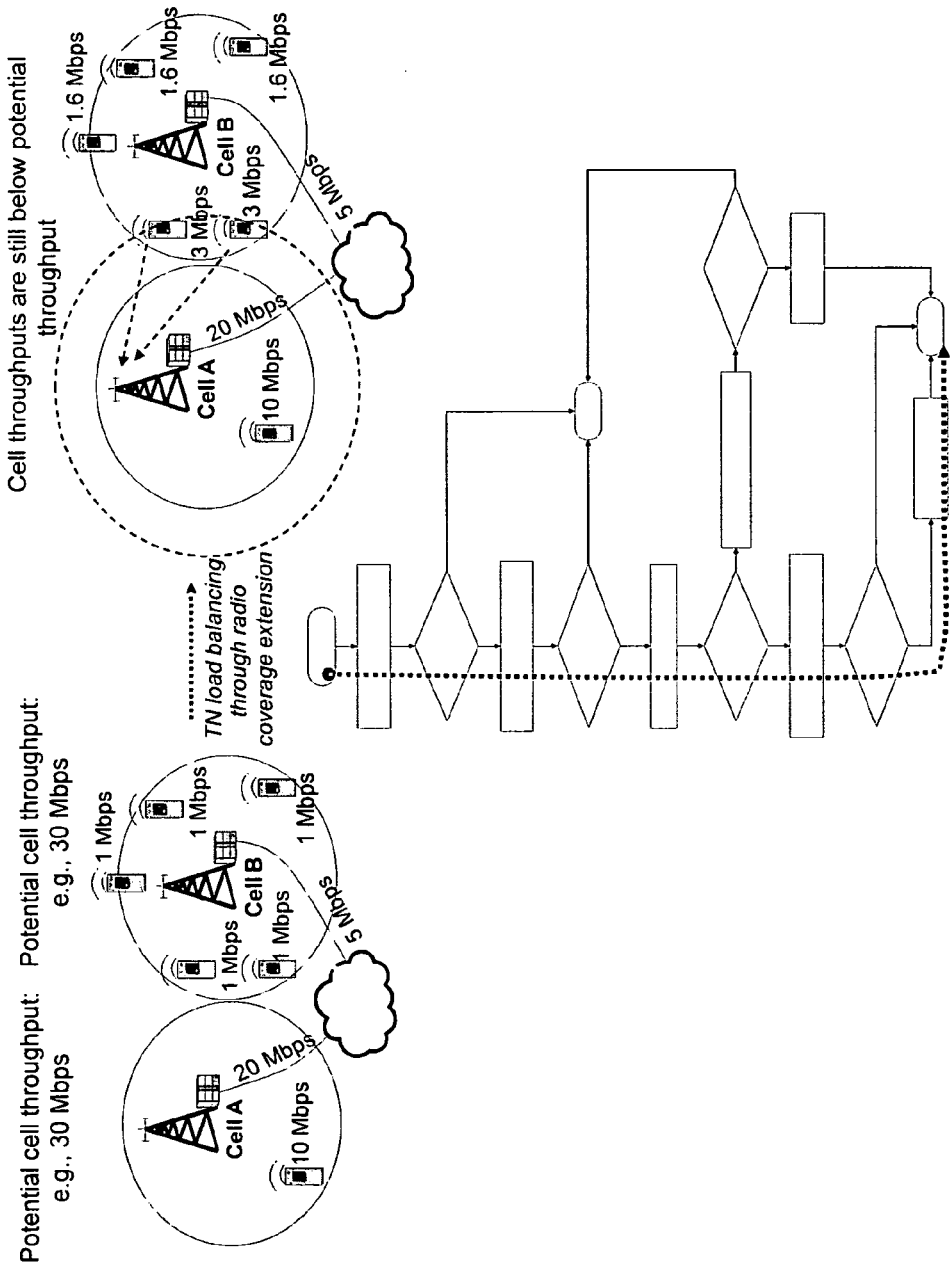

Now turning to FIG. 9B, a practical example is shown in which the TN LB method is finally switched on. As can be seen in the upper part of FIG. 9B, the example from FIG. 5 is resumed. The first threshold is approximately 80% of the full capacity of the cable interface of the first cell/BS 2001 A. Here, in cell A 2001, cable load is 50% (10 Mbps of sole UE divided by 20 Mbps full TN capacity). As 50% is not greater than 80%, the first condition is fulfilled.

The second threshold is approximately 50% of the full capacity of the air interface of the first cell. Here, in cell A 2001, air load is ~33% (10 Mbps of sole UE divided by 30 Mbps full air capacity). As 33% is not greater than 50%, the second condition is fulfilled.

The third threshold is approximately 90% of the full capacity of the cable interface of the second cell. Here, in cell B 2002, TN load is 100% (1 Mbps per UE times 5 UEs divided by 5 Mbps full cable capacity). As 100% is greater than 90%, the third condition is fulfilled.

The fourth threshold is approximately 60% of the full capacity of the air interface of the second cell. Here, in cell B 2002, air load is ~17% (1 Mbps per UE times 5 UEs divided by 30 Mbps full air capacity). As 17% is not greater than 60%, the fourth condition is fulfilled, and hence TN LB is switched on.

Figure 10:
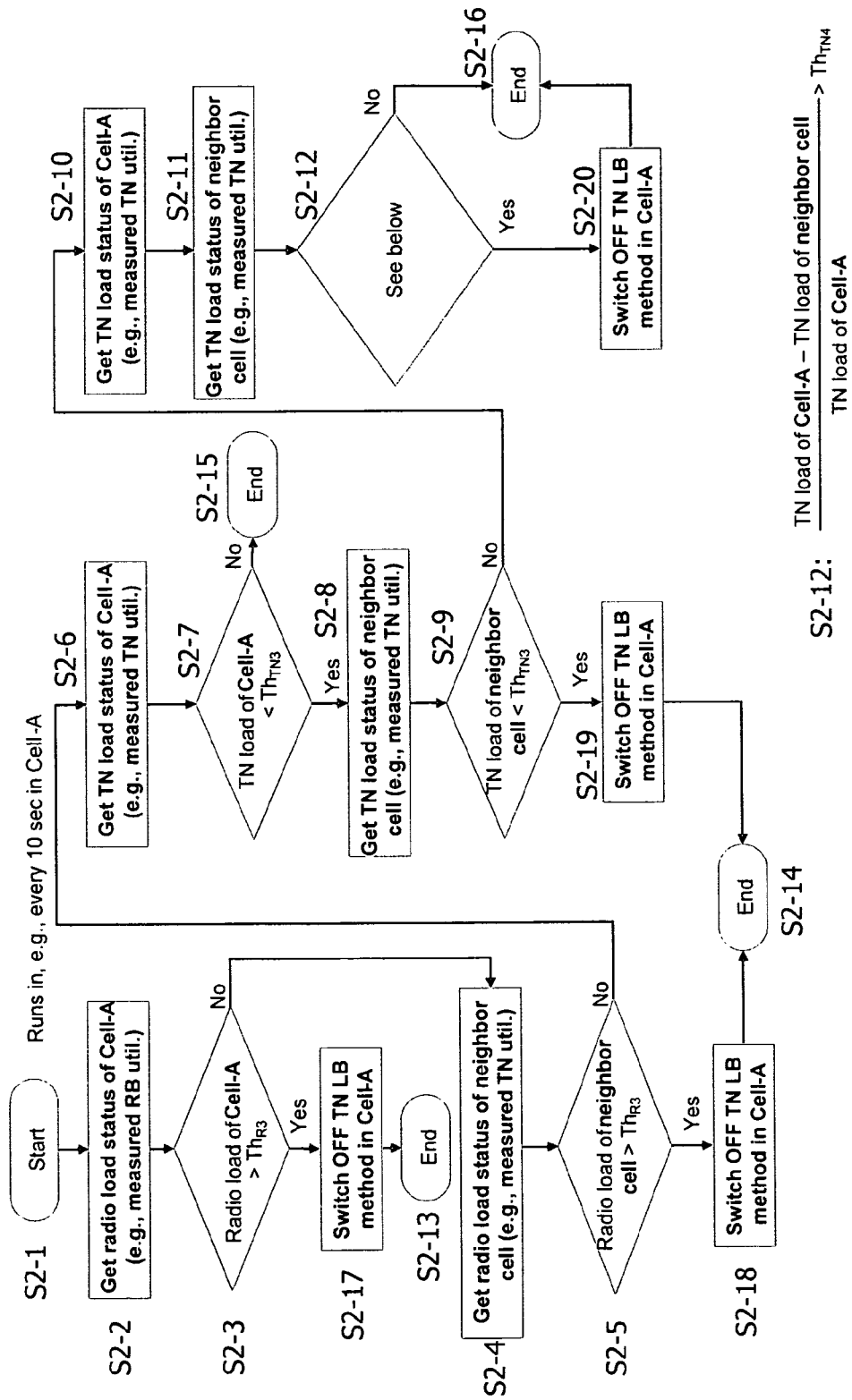
FIG. 10 illustrates the second process for switching off the Transport Network Load Balancing.

As opposed to the first method for switching on TN LB, FIG. 10 shows the second method for switching off TN LB. Optionally, in step S2-3, the comparator 20019 performs a first comparing step so as to determine whether the air interface load status of the first cell is greater than a first threshold $Th_{R3}$. If the result is negative, in step S2-5, the comparator 20019 performs a second comparing step so as to determine whether the air interface load status of the second cell is greater than a second threshold $Th_{R3}$. If at least one of the comparing results is positive, in step S2-17 or S2-18, the determiner 20017 returns a declining result, and hence TN LB is switched off. The first threshold is approximately 80% of the full capacity of the air interface of the first cell, and the second threshold is approximately 80% of the full capacity of the air interface of the second cell.

It is to be noted that the above first series of switching-off conditions may be performed independently, or else, if the second result is negative, the below second series of switch-off conditions may be evaluated.

In step S2-7, the comparator 20019 performs a first comparing step so as to determine whether the cable interface load status of the first cell is smaller than a first threshold $Th_{TN3}$. If the result is positive, in step S2-9, the comparator 20019 performs a second comparing step so as to determine whether the cable interface load status of the second cell is smaller than a second threshold $Th_{TN3}$. If both comparing results are positive, in step S2-19, the determiner 20017 returns a declining result, and hence TN LB is switched off. The first threshold is approximately 50% of the full capacity of the cable interface of the first cell, and the second threshold is approximately 50% of the full capacity of the cable interface of the second cell.

It is to be noted that the above second series of switching-off conditions may be performed independently, or else, if the second result is negative, the below third series of switch-off conditions may be evaluated.

In step S2-12, the calculator 200110 calculates a quotient, the dividend being a difference, and the divisor being the cable interface load status of the first cell, wherein the minuend of the difference is the cable interface load status of the first cell and the subtrahend of the difference is the cable interface load status of the second cell. Then, the comparator 20019 performs a comparing step so as to determine whether the calculated quotient is greater than a threshold $Th_{TN4}$. If the result is positive, the determiner 20017 returns a declining result, and hence TN LB is switched off. The threshold is approximately 10% of the full capacity of the cable interface of the first cell.

Then, returning to FIG. 7, if a decision in favour of TN LB has been made in the determining step S3, the reconfigurator 20018 reconfigures, if a result of the determination is affirmative, at least one air interface configuration parameter of the first cell 2001 so as to off-load at least a part of mobile-originated traffic from the second 2002 cell to the first cell 2001. Optionally, the step of reconfiguring may further comprise a step S5 of extending air interface coverage of the first cell 2001.

Figure 11:
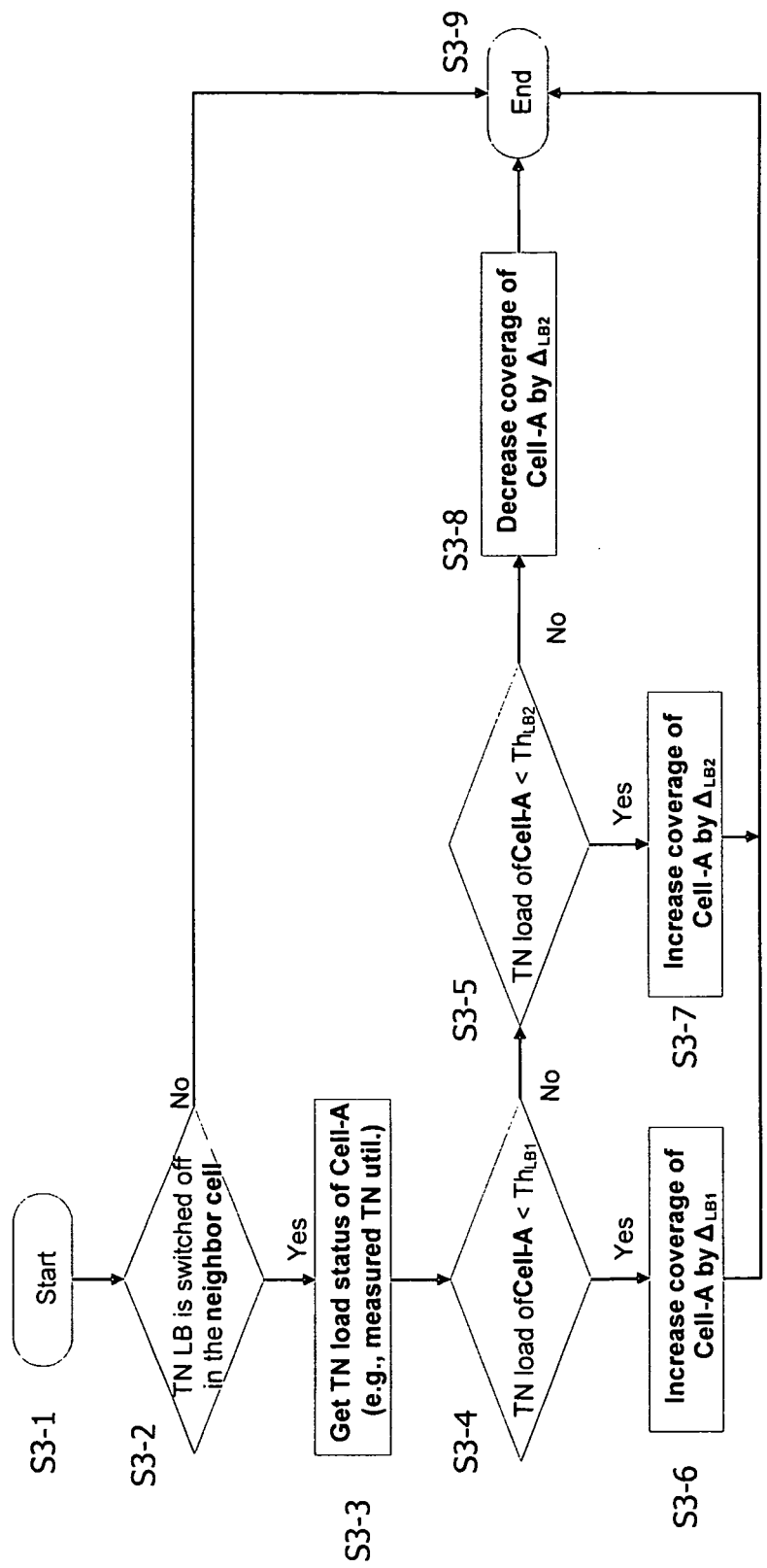
FIG. 11 illustrates the third process for extending coverage of the first cell involved in Transport Network Load Balancing.

FIG. 11 shows the third method for performing actual TN LB e.g. by extending cell coverage of (first) cell A 2001 by means of the extender 200111. After the cell A 2001 has decided to switch on TN LB (step S3-1, see above-described first method), in step S3-2, the receiver 20013 receives an indication from (the transmitter 20024 of) the second cell 2002 whether the second cell is to perform the cable interface-based LB (or TN LB).

If the received indication is negative, in step S3-4, the comparator 20019 performs a first comparing step so as to determine whether the cable interface load status of the first cell is smaller than a first threshold $Th_{LB1}$. If the result is positive, in step S3-6, the reconfigurator 20018 (and the extender 200111) increases air interface coverage of the first cell 2001 by a first amount $\Delta_{LB1}$. The first threshold is approximately 50% of the full capacity of the cable interface of the first cell 2001, and the first amount is an increase of approximately 20% of a radius of the first cell 2001.

However, if the determination in the first comparing step is negative, in step S3-5, the comparator 20019 performs a second comparing step so as to determine whether the cable interface load status of the first cell 2001 is smaller than a second threshold $Th_{LB2}$. If the result is positive, in step S3-7, the reconfigurator 20018 (and the extender 200111) increases air interface coverage of the first cell 2001 by a second amount $\Delta_{LB2}$. The second threshold is greater than the first threshold, and the second amount is smaller than the first amount. Moreover, the second threshold is approximately 80% of the full capacity of the cable interface of the first cell 2001, and the second amount is an increase of approximately 10% of a radius of the first cell 2001.

However, if also the determination in the second comparing step is negative, in step S3-8, the reconfigurator 20018 (and the extender 200111) decreases air interface coverage of the first cell by a third amount. The decrease of the third amount is, as an absolute, equal to the increase of the second amount. The third amount is a decrease of approximately 10% of a radius of the first cell 2001.

Preferably, thresholds $Th_{LB1}$ and $Th_{LB2}$ are set such that $Th_{LB1} < Th_{LB2}$. The above third method also avoids the unwanted situation when the neighbor cell B 2002 is also extending its coverage. In that case, the neighbor cell B 2002 does not need "help" carrying the load, since the higher cable utilization of the neighbor cell B 2002 is due to the "offered help" to cell A 2001.

It is to be noted that there is a certain reversing effect to the processing in step S3-8. When reaching step S3-8, this means that the cell A 2001 has originally determined that its cable/air load is low, and thus cell A was capable to offload traffic from cell B 2002 (see switching on method in FIG. 9A). However, due to special circumstances, the cable load in cell A 2001 may have increased in the meantime (as detected now in step S3-3). If so, then step S3-8 effectively decreases the coverage of cell A 2001; this means that instead of offloading traffic from cell B 2002, cell A 2001 may deliberately "loose" the UEs located at the overlapping cell edges between cells A and B. In fact, this would mean that cell A has one more opportunity to avoid overtaking network traffic if the (sudden) need for such avoidance should arise.

In this context, the practical example shown in FIGS. 5 and 9B is resumed. In the example, the first threshold $Th_{LB1}$ is 50% (of the full TN capacity of cell A 2001), the second threshold $Th_{LB2}$ is 80%, the first amount $\Delta_{LB1}$ is 20% (increase of the cell radius), and the second amount $\Delta_{LB2}$ is 10%. In step S3-3, the cable load of cell A 2001 is retrieved. Recall that the cable load of cell A before TN LB is 50% (10 Mbps of sole UE divided by 20 Mbps full cable capacity), assuming that no change in the cable load of cell A 2001 has occurred.

In step S3-4, 50% is not smaller than 50%, hence the result is "no". In step S3-5, the TN load of cell A 2001 of 50% is smaller than 80%, hence the result is "yes". Accordingly, the processing proceeds to step S3-7, in which the cell coverage is increased by 10% (see also dashed line in FIG. 5). Afterwards, the processing ends (step S3-9).

Figure 12:
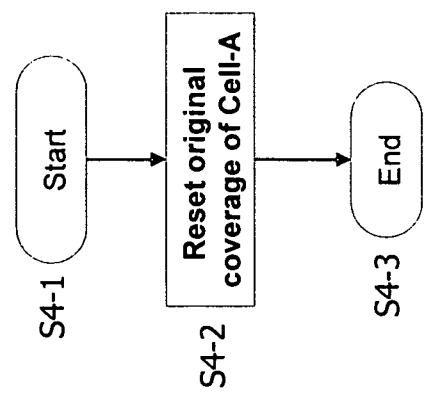
FIG. 12 illustrates the fourth process for resetting coverage of the first cell involved in Transport Network Load Balancing.

Finally, if the switch-off method shown in FIG. 10 triggers switching off of the TN LB, there is the fourth method shown in FIG. 12, in which the reconfigurator 20018 (and the extender 200111) perform an optional step S4-2 for resetting the at least one air interface configuration parameter of the first cell 2001 to its original state.

As has become apparent from the above description of exemplary embodiments, the LB technique described herein permits an increased utilization of the TN. The increased utilization of the TN results in an improved overall system throughput, in particular in situations with one or more congested air interfaces.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for cable interface-based load balancing, LB, between a first cell and a second cell in a mobile communication network, each cell comprising at least a cable interface and an air interface, and each cell being associated with a parameter set comprising a load status of the air interface and a load status of the cable interface of the respective cell, the method being performed in a control entity of the first cell and comprising the steps of:
   determining the parameter set of the first cell;
   obtaining the parameter set of the second cell or information indicative thereof;
   determining whether the air interface load status and cable interface load status of the first cell are low, whether the air interface load status of the second cell is low, and whether the cable interface load status of the second cell is high, wherein:
      the determining step is performed based on comparing the air interface load status and cable interface load status of the first cell and the air interface load status and cable interface load status of the second cell with at least one threshold each,
      the at least one threshold comprises a first threshold for the cable interface load status of the first cell, a second threshold for the air interface load status of the first cell, a third threshold for the cable interface load status of the second cell, and a fourth threshold for the air interface load status of the second cell, and
      the third threshold is greater than the maximum of the first, second and fourth thresholds; and
   reconfiguring, if the determination is affirmative, at least one air interface configuration parameter of the first cell to off-load at least a part of mobile-originated traffic from the second cell to the first cell.

2. The method of claim 1, further comprising:
   receiving an indication from the second cell whether the second cell is to perform the cable interface-based LB.

3. The method of claim 2, further comprising:
   if the received indication is negative, performing a first comparing step to determine whether the cable interface load status of the first cell is smaller than a first threshold; and
   increasing air interface coverage of the first cell by a first amount if the determination in the first comparing step is positive.

4. The method of claim 3, wherein:
   the first threshold is approximately fifty percent of the full capacity of the cable inter-face of the first cell, and
   the first amount is an increase of approximately twenty percent of a radius of the first cell.

5. The method of claim 3, further comprising:
   if the determination in the first comparing step is negative, performing a second comparing step to determine whether the cable interface load status of the first cell is smaller than a second threshold; and
   increasing air interface coverage of the first cell by a second amount if the determination in the second comparing step is positive.

6. The method of claim 5, wherein:
   the second threshold is greater than the first threshold, and the second amount is smaller than the first amount.

7. The method of claim 5, wherein:
   the second threshold is approximately eighty percent of the full capacity of the cable interface of the first cell, and
   the second amount is an increase of approximately ten percent of a radius of the first cell.

8. The method of claim 5, further comprising:
   if the determination in the second comparing step is negative, decreasing air interface coverage of the first cell by a third amount.

9. The method of claim 8, wherein the decrease of the third amount is, as an absolute, equal to the increase of the second amount.

10. The method of claim 8, wherein the third amount is a decrease of approximately ten percent of a radius of the first cell.

11. The method of claim 1, wherein the step of reconfiguring further comprises:
    extending air interface coverage of the first cell.

12. The method of claim 11, wherein the air interface coverage is increased dependent on the cable interface load status in the first cell.

13. The method of claim 11, wherein the air interface coverage is increased dependent on an amount of traffic the first cell is capable of off-loading from the second cell.

14. The method of claim 11, wherein the air interface coverage is increased dependent on a number of the cell-edge user equipments in one or both of the first and second cells.

15. The method of claim 11, wherein the air interface coverage is increased dependent on average traffic per user equipment in the second cell.

16. The method of claim 11, wherein the air interface coverage is defined by cell borders of the first cell.

17. The method of claim 16, wherein the cell borders are determined by one of a circle and a honeycomb centered on a base station of the first cell.

18. The method of claim 1, wherein the at least one air interface configuration parameter is at least one handover parameter.

19. The method of claim 18, wherein the at least one handover parameter is a handover offset parameter.

20. The method of claim 1, wherein the determining step comprises:
    a first comparing step to determine whether the cable interface load status of the first cell is greater than the first threshold;
    a second comparing step to determine whether the air interface load status of the first cell is greater than the second threshold;
    a third comparing step to determine whether the cable interface load status of the second cell is greater than the third threshold;
    a fourth comparing step to determine whether the cable interface load status of the second cell is greater than the fourth threshold; and
    returning an affirmative result if all of the following conditions are fulfilled:
       the determination in the first comparing step is negative,
       the determination in the second comparing step is negative,
       the determination in the third comparing step is positive, and
       the determination in the fourth comparing step is negative.

21. The method of claim 20, wherein any one or more of the following threshold settings are used:
    the first threshold is approximately eighty percent of the full capacity of the cable inter-face of the first cell;
    the second threshold is approximately fifty percent of the full capacity of the air inter-face of the first cell;
    the third threshold is approximately ninety percent of the full capacity of the cable interface of the second cell; and the fourth threshold is approximately sixty percent of the full capacity of the air inter-face of the second cell.

22. The method of claim 1, wherein the determining step comprises:
   a first comparing step to determine whether the air interface load status of the first cell is greater than the first threshold;
   a second comparing step to determine whether the air interface load status of the second cell is greater than the second threshold; and
   returning a declining result if at least one of the determinations in the first and second comparing steps is positive.

23. The method of claim 22, wherein:
   the first threshold is approximately eighty percent of the full capacity of the air interface of the first cell; and
   the second threshold is approximately eighty percent of the full capacity of the air inter-face of the second cell.

24. The method of claim 1, wherein the determining step comprises:
   calculating a quotient, the dividend being a difference, and the divisor being the cable interface load status of the first cell, wherein the minuend of the difference is the cable interface load status of the first cell and the subtrahend of the difference is the cable interface load status of the second cell;
   a comparing step to determine whether the calculated quotient is greater than a fifth threshold and
   returning a declining result if the determination in the comparing step is positive.

25. The method of claim 24, wherein the fifth threshold is approximately ten percent of the full capacity of the cable interface of the first cell.

26. The method of claim 1, wherein the determining step comprises:
   a first comparing step to determine whether the cable interface load status of the first cell is smaller than the first threshold;
   a second comparing step to determine whether the cable interface load status of the second cell is smaller than the second threshold; and
   returning a declining result if both of the determinations in the first and second comparing steps are positive.

27. The method of claim 26, wherein:
   the first threshold is approximately fifty percent of the full capacity of the cable interface of the first cell; and
   the second threshold is approximately fifty percent of the full capacity of the cable interface of the second cell.

28. The method of claim 1, wherein the at least one air interface configuration parameter is an antenna tilt of a base station of the first cell.

29. The method of claim 1, wherein the at least one air interface configuration parameter is a transmit power of a base station of the first cell.

30. The method of claim 1, wherein the mobile-originated traffic stems from at least one user equipment to be off-loaded from the second cell to the first cell.

31. The method of claim 25, further comprising:
   if the result is declining, resetting the at least one air interface configuration parameter of the first cell to its original state.

32. The method of claim 1, wherein the obtaining and determining steps are performed periodically.

33. The method of claim 1, wherein the load statuses are determined by the measured utilizations.

34. A non-transitory computer readable medium storing a computer program product comprising program code portions which, when executed on a computing device of a network control entity, configures the network control entity to perform cable interface-based load balancing, LB, between a first cell and a second cell in a mobile communication network, each cell comprising at least a cable interface and an air interface, and each cell being associated with a parameter set comprising a load status of the air interface and a load status of the cable interface of the respective cell, the method being performed in a control entity of the first cell, said computer program product comprising program instructions to instruct the computing device to:
   determine the parameter set of the first cell;
   obtain the parameter set of the second cell or information indicative thereof;
   determine whether the air interface load status and cable interface load status of the first cell are low, whether the air interface load status of the second cell is low, and whether the cable interface load status of the second cell is high, wherein:
      the determining operation is performed based on comparing the air interface load status and cable interface load status of the first cell and the air interface load status and cable interface load status of the second cell with at least one threshold each,
      the at least one threshold comprises a first threshold for the cable interface load status of the first cell, a second threshold for the air interface load status of the first cell, a third threshold for the cable interface load status of the second cell, and a fourth threshold for the air interface load status of the second cell, and
      the third threshold is greater than the maximum of the first, second and fourth thresholds; and
   reconfigure, if the determination is affirmative, at least one air interface configuration parameter of the first cell to off-load at least a part of mobile-originated traffic from the second cell to the first cell.

35. A control entity for a first cell for cable interface-based load balancing, LB, between the first cell and a second cell in a mobile communication network, each cell comprising at least a cable interface and an air interface, and each cell being associated with a parameter set comprising a load status of the air interface and a load status of the cable interface of the respective cell, wherein the control entity for the first cell comprises at least one processor configured to:
   determine the parameter set of the first cell;
   obtain the parameter set of the second cell or information indicative thereof;
   determine whether the air interface load status and cable interface load status of the first cell are low, whether the air interface load status of the second cell is low, and whether the cable interface load status of the second cell is high, wherein:
      the determining is performed based on comparing the air interface load status and cable interface load status of the first cell and the air interface load status and cable interface load status of the second cell with at least one threshold each,
      wherein the at least one threshold comprises a first threshold for the cable interface load status of the first cell, a second threshold for the air interface load status of the first cell, a third threshold for the cable interface load status of the second cell, and a fourth threshold for the air interface load status of the second cell, and
      wherein the third threshold is greater than the maximum of the first, second and fourth thresholds; and
   reconfigure, if the determination is affirmative, at least one air interface con-figuration parameter of the first cell to off-load at least a part of the mobile-originated traffic from the second cell to the first cell.

\* \* \* \* \*

UNITED STATES PATENT AND TRADEMARK OFFICE
CERTIFICATE OF CORRECTION

| | | |
|---|---|---|
| PATENT NO. | : 9,288,707 B2 | Page 1 of 1 |
| APPLICATION NO. | : 14/366554 | |
| DATED | : March 15, 2016 | |
| INVENTOR(S) | : Reider et al. | |

It is certified that error appears in the above-identified patent and that said Letters Patent is hereby corrected as shown below:

On the Title Page, Item (57), under "ABSTRACT", in Column 2, Line 8, delete "statues" and insert -- statuses --, therefor.

Signed and Sealed this
Thirty-first Day of May, 2016

Michelle K. Lee
*Director of the United States Patent and Trademark Office*